(12) United States Patent
Kato et al.

(10) Patent No.: US 11,695,268 B2
(45) Date of Patent: Jul. 4, 2023

(54) LOAD DRIVE CIRCUIT, MOTOR DRIVE CONTROL DEVICE, AND MOTOR UNIT

(71) Applicant: MINEBEA MITSUMI Inc., Nagano (JP)

(72) Inventors: Hiroyuki Kato, Fukuroi (JP); Toshikazu Koshiba, Kakegawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 80 days.

(21) Appl. No.: 17/379,158

(22) Filed: Jul. 19, 2021

(65) Prior Publication Data

US 2022/0029409 A1 Jan. 27, 2022

(30) Foreign Application Priority Data

Jul. 27, 2020 (JP) .................. 2020-126541

(51) Int. Cl.
| | |
|---|---|
| *H02P 27/06* | (2006.01) |
| *H02H 7/08* | (2006.01) |
| *H02H 7/122* | (2006.01) |
| *H02H 9/02* | (2006.01) |
| *H02M 7/5387* | (2007.01) |
| *H02M 3/07* | (2006.01) |
| *H02M 1/32* | (2007.01) |

(52) U.S. Cl.
CPC .......... *H02H 7/0833* (2013.01); *H02H 7/122* (2013.01); *H02H 9/025* (2013.01); *H02M 1/32* (2013.01); *H02M 3/07* (2013.01); *H02M 7/5387* (2013.01); *H02P 27/06* (2013.01)

(58) Field of Classification Search
CPC ...... H02H 7/0833; H02H 7/122; H02H 9/025; H02M 1/32; H02M 3/07; H02M 7/5387; H02P 27/06
See application file for complete search history.

(56) References Cited

U.S. PATENT DOCUMENTS

| | | | | |
|---|---|---|---|---|
| 9,817,412 | B2 * | 11/2017 | Sakaguchi | .............. H02M 7/48 |
| 9,871,513 | B2 * | 1/2018 | Iwamizu | .............. H03K 17/687 |
| 9,899,834 | B1 * | 2/2018 | Mayo | ...................... H02J 1/082 |
| 2015/0277457 | A1 | 10/2015 | Sakabuchi et al. | |

FOREIGN PATENT DOCUMENTS

| | | |
|---|---|---|
| JP | 11-187578 A | 7/1999 |
| JP | 2007-082374 A | 3/2007 |
| JP | 2015-192317 A | 11/2015 |

* cited by examiner

*Primary Examiner* — Rina I Duda
(74) *Attorney, Agent, or Firm* — Pearne & Gordon LLP

(57) ABSTRACT

A protection function of an electronic device is realized with a lower cost. A load drive circuit 102 includes: transistors Qa and Qb for protection of an N-channel type connected between a power source terminal P1 and a power source end P7 for driving; an inverter circuit 14 that drives a load based on an input drive control signal Sd, the inverter circuit 14 being disposed between the power source end P7 for driving and a ground potential; and a booster unit 16 including a capacitor C1 having one terminal connected to an output end of the inverter circuit 14, the booster unit 16 generating, across another terminal of the capacitor C1, a voltage exceeding a power source voltage Vdc, and applying the voltage to control electrodes of the transistors Qa and Qb for protection.

7 Claims, 4 Drawing Sheets

LOAD DRIVE CIRCUIT, MOTOR DRIVE CONTROL DEVICE, AND MOTOR UNIT

CROSS REFERENCE TO RELATED APPLICATIONS

This application claims the benefit of Japanese Patent Application No. 2020-126541, filed Jul. 27, 2020, which is hereby incorporated by reference in its entirety.

BACKGROUND

Technical Field

The present disclosure relates to a load drive circuit, a motor drive control device, and a motor unit.

Background

In general, in electronic devices such as a motor unit including a motor, a protection circuit is provided in order to prevent failures and malfunctions of electronic parts caused by an abnormal current generated when a power source is connected to the electronic device in reverse polarity (at the time of power source reverse connection).

In recent years, in the motor unit, the capacity of a decoupling capacitor (bypass capacitor) inserted in a power source line for supplying electric power to the motor from the power source is on the increase due to increase of power consumption associated with improvement in performance and increase in output of the motor. Therefore, as a protection function of the motor unit, a function (hereinafter also referred to as an "inrush current suppression function") of suppressing an inrush current at power-on is beginning to be required in addition to a function (hereinafter also referred to as a "power-supply reverse-connection protection function") of preventing the failures of the electronic parts caused by the power source reverse connection described above.

Hitherto, many of the protection circuits having the power-supply reverse-connection protection function and the inrush current suppression function have been realized by a circuit in which two P-channel-type Metal-Oxide-Semiconductor Field-Effect Transistors (MOSFETs) are connected in series on the positive electrode side of the power source line.

However, as compared to an N-channel-type MOSFET, a P-channel-type MOSFET generates a large amount of heat due to having a large on-resistance (low current rating), and is expensive because the manufacturing process is complicated and the chip area is large. There is also a fact that, in recent years, manufacturers supplying P-channel-type MOSFETs are decreasing and options for products are decreasing.

From reasons as above, in recent years, a protection circuit using the N-channel-type MOSFET instead of the P-channel-type MOSFET is needed. For example, in Japanese Patent Laid-Open No. 11-187578, Japanese Patent Laid-Open No. 2007-82374, and Japanese Patent Laid-Open No. 2015-192317, protection circuits using the N-channel-type MOSFET are disclosed.

SUMMARY

In general, in a protection circuit using an N-channel-type MOSFET, in order to completely turn on N-channel-type MOSFETs connected to a power supply line in series, a voltage higher than a power source voltage needs to be applied to gate terminals of the N-channel-type MOSFETs. Therefore, as indicated in Japanese Patent Laid-Open No. 11-187578, Japanese Patent Laid-Open No. 2007-82374, and Japanese Patent Laid-Open No. 2015-192317, a charge pump circuit serving as a booster circuit for generating a drive voltage of the N-channel-type MOSFETs needs to be separately provided when the N-channel-type MOSFETs are employed in the protection circuit connected to the power source line.

However, even when the N-channel-type MOSFETs is employed instead of P-channel-type MOSFET for the purpose of cost reduction, the cost increases as a result when the charge pump circuit is provided as indicated in Japanese Patent Laid-Open No. 11-187578, Japanese Patent Laid-Open No. 2007-82374, and Japanese Patent Laid-Open No. 2015-192317.

The present disclosure is related to realizing a protection function of an electronic device with a lower cost.

A load drive circuit according to a representative embodiment includes: a power source terminal supplied with a power source voltage; a power source end for driving supplied with a drive voltage for giving electric power to a load; a protection circuit including a transistor for protection of an N-channel type connected between the power source terminal and the power source end for driving; an inverter circuit configured to drive the load based on an input drive control signal, the inverter circuit being disposed between the power source end for driving and a ground potential; and a booster unit including a capacitor having one terminal connected to an output end of the inverter circuit, the booster unit being configured to generate, across another terminal of the capacitor, a voltage exceeding the power source voltage, and apply the voltage to a control electrode of the transistor for protection.

In accordance with one aspect of the present disclosure, the protection function of the electronic device can be realized with a lower cost.

DETAILED DESCRIPTION

1. Outline of Embodiment

Figure 1:
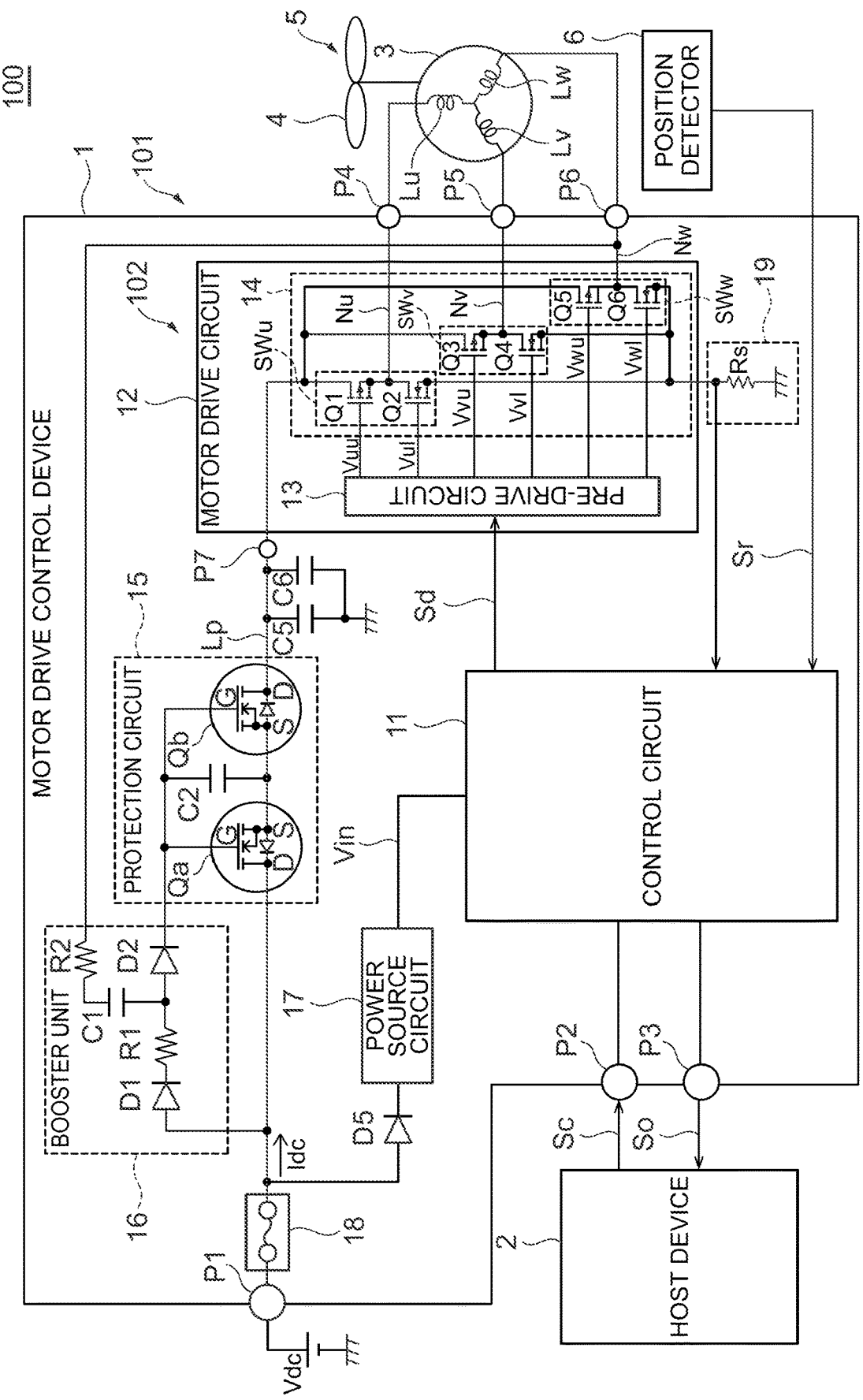
FIG. 1 is a diagram illustrating a configuration of a motor drive control system including a load drive circuit according to an embodiment of the present disclosure.

First, an outline is described for a representative embodiment of the disclosure disclosed in the present application. In the description below, as one example, reference characters in the drawings corresponding to component elements of the disclosure are described with parentheses.

[1] A load drive circuit (102) according to a representative embodiment of the present disclosure includes: a power source terminal (P1) supplied with a power source voltage (Vdc); a power source end (P7) for driving supplied with a drive voltage for giving electric power to a load (3); a protection circuit (15) including a transistor (Qa and Qb) for protection of an N-channel type connected between the power source terminal and the power source end for driving; an inverter circuit (14) configured to drive the load based on an input drive control signal (Sd), the inverter circuit (14) being disposed between the power source end for driving and the ground potential; and a booster unit (16) including a capacitor (C1) having one terminal connected to an output end (Nu/Nv/Nw) of the inverter circuit, the booster unit (16) being configured to generate, across another terminal of the capacitor, a voltage exceeding the power source voltage, and apply the voltage to a control electrode of the transistor for protection.

[2] In the load drive circuit according to abovementioned [1], the booster unit may further include: a first rectifier element (D1) configured to flow current to the capacitor side from the power source terminal side, the first rectifier element (D1) being connected between the power source terminal and the other terminal of the capacitor; and a second rectifier element (D2) configured to flow current to the control electrode side of the transistor for protection from the capacitor side, the second rectifier element (D2) being connected between the other terminal of the capacitor and the control electrode of the transistor for protection.

[3] In the load drive circuit according to abovementioned [2], two of the transistors for protection may be included, and the two transistors for protection may be connected to each other in series on a power source line coupling the power source terminal with the power source end for driving.

[4] In the load drive circuit according to abovementioned [2] or [3], the booster unit may further include: a first resistor (R1) connected between the first rectifier element and the other terminal of the capacitor; and a second resistor (R2) connected between the one terminal of the capacitor and the output end of the inverter circuit.

[5] In the load drive circuit according to abovementioned [2] or [3], the booster unit may further include a resistor (R3) connected between the second rectifier element and the control electrode of the transistor for protection.

[6] A motor drive control device (1) according to a representative embodiment of the present disclosure includes: a control circuit (11) configured to generate the drive control signal (Sd); and a load drive circuit (102) according to any one of abovementioned [1] to [5]. In the motor drive control device (1), the load is a motor (3).

[7] In the motor drive control device according to abovementioned [6], the load drive circuit may include a plurality of switching legs (SWu, SWv, and SWw) each including two transistors (Q1 and Q2, Q3 and Q4, and Q5 and Q6) for driving connected in series between the power source end for driving and the ground potential, and the control circuit may have a load drive mode for controlling switching operation of the transistors (Q1 to Q6) for driving of the plurality of switching legs and driving the motor, and a booster mode for controlling switching operation of the transistors (Q5 and Q6) for driving of one (SWw) of the switching legs and driving the booster unit.

[8] In the motor drive control device according to abovementioned [6] or [7], the control circuit may operate by electric power supply from a route not passing through the transistor for protection.

[9] A motor unit (101) according to a representative embodiment of the present disclosure includes: the motor drive control device (1) according to any one of abovementioned [6] to [8]; and the motor (3).

2. Specific Example of Embodiment

Hereinafter, a specific example of the embodiment of the present disclosure will be described with reference to the accompanying drawings. In the description below, component elements shared by embodiments are denoted by the same reference characters, and repetitive descriptions are omitted.

Embodiment

FIG. 1 is a diagram illustrating a configuration of a motor drive control system including a load drive circuit according to the embodiment of the present disclosure.

A motor drive control system 100 illustrated in FIG. 1 includes a motor 3 serving as one example of a load to be driven, a motor drive control device 1 including a load drive circuit 102 that drives the motor 3, and a host device 2 that controls the motor drive control device 1.

For example, an impeller (vane wheel) 4 is connected to an output shaft (not shown) of the motor 3, and the motor 3 and the impeller 4 form a fan (fan motor) 5 that rotates the impeller 4 by the rotational force of the motor 3 and generates wind.

The fan 5 can be used as one of cooling apparatuses that release heat generated on the inside of a device to the outside and cool the inside of the device and can be installed in machine tools and the like used under an environment in which oil mist, cutting chips, smoke, dust, and the like are generated in addition to information processing apparatuses such as a server, for example. The fan 5 is an axial fan, for example.

The motor 3 and the motor drive control device 1 form one motor unit 101.

The host device 2 is a program processing apparatus such as a CPU in the server in which the fan 5 is installed, for example. The host device 2 controls the rotation of the motor 3 via the motor drive control device 1 by outputting a drive command signal Sc to the motor drive control device 1, acquires a motor drive information signal So relating to the drive state of the motor 3 (fan 5) from the motor drive control device 1, and monitors the operation of the motor 3 (fan 5). As described below, as the motor drive information signal So, a signal (for example, a rotational speed signal corresponding to the rotational speed of the motor) indicating the rotation state of the motor 3 (fan 5) and the like can be exemplified.

The drive command signal Sc is a signal including a command relating to the driving of the motor 3. The drive command signal Sc includes a command ordering a target rotational speed (target number of revolutions) of the motor 3, for example. For example, the drive command signal Sc is a pulse width modulation (PWM) signal having a duty ratio corresponding to the target rotational speed of the motor 3. The drive command signal Sc may be signals of other formats such as a PFM signal having a frequency corresponding to the target rotational speed and a torque command signal indicating a target value of the torque of the motor 3.

The host device 2 orders the motor drive control device 1 to rotate the motor 3 (fan 5) at the target rotational speed by outputting a PWM signal having a duty ratio in accordance with the target rotational speed as the drive command signal Sc, for example, at normal time.

The host device 2 monitors the operation state of the motor 3 by acquiring a rotational speed signal in accordance with an actual rotational speed of the motor 3 from the motor drive control device 1 as the motor drive information signal So.

The motor 3 is a brushless DC motor, for example. In the present embodiment, the motor 3 is a three-phase brushless DC motor having a coil of three phases, that is, a U phase, a V phase, and a W phase, for example.

A position detector 6 is a device that generates a position detection signal Sr in accordance with the rotation of a rotor of the motor 3. The position detector 6 is a Hall (HALL) element, for example. For example, three Hall elements respectively corresponding to the phases (the U phase, the V phase, and the W phase) of the motor 3 are disposed around the rotor of the motor 3 as the position detector 6 so as to be substantially equally spaced apart from each other (for example, spaced apart from a neighboring one by at an interval of 120 degrees). Each of the three Hall elements detects the magnetic pole of the rotor and generates and outputs a Hall signal of which voltage changes in accordance with the rotation of the rotor. The Hall signal output from each of the Hall elements is input to a control circuit 11 as the position detection signal Sr. The control circuit 11 can detect the rotation state of the motor 3 and control the driving of the motor 3 by acquiring information such as the rotational position of the motor 3 and information (an FG signal and the like) on the number of revolutions with use of the Hall signal.

As the position detector 6, an encoder, a resolver, and the like may be provided instead of the Hall element as above, and detection signals of the encoder, the resolver, and the like may be input to the control circuit 11 as the position detection signals Sr, for example. When the control circuit 11 performs the drive control of the motor 3 with a position sensor-less method, the position detector 6 does not necessarily need to be provided.

The motor drive control device 1 controls the rotation of the motor 3 in accordance with a command from the host device 2. For example, the motor drive control device 1 causes the motor 3 to rotate by outputting a sinusoidal drive signal to the motor 3 in accordance with the drive command signal Sc from the host device 2 and causing a drive current in a sinusoidal form to periodically flow through coils Lu, Lv, and Lw of the U phase, the V phase, and the W phase of the motor 3.

As illustrated in FIG. 1, the motor drive control device 1 includes a plurality of external terminals, the control circuit 11, a motor drive circuit 12, a power cutoff circuit 18, a protection circuit 15, a booster unit 16, a power source circuit 17, and a current detection circuit 19. Component elements of the motor drive control device 1 illustrated in FIG. 1 are a part of the whole, and the motor drive control device 1 may have other component elements in addition to the component elements illustrated in the FIG. 1.

When the motor 3 is considered to be a load, the motor drive circuit 12 (including a pre-drive circuit 13 and an inverter circuit 14), the protection circuit 15, and the booster unit 16 form one load drive circuit 102.

The plurality of external terminals are terminals for connecting the motor drive control device 1 and external devices (for example, the host device 2 and the motor 3) to each other. In FIG. 1, terminals P1 to P6 out of the external terminals of the motor drive control device 1 are representatively illustrated.

The terminal P1 is a power source terminal to which a power source voltage Vdc (DC voltage) serving as a main power source for driving the motor 3 and the motor drive control device 1 is supplied. Hereinafter, the terminal P1 is also referred to as a "power source terminal P1".

The terminal P2 is an input terminal for inputting signals from external devices such as the host device 2. For example, the drive command signal Sc output from the host device 2 is input to the terminal P2.

The terminal P3 is an output terminal for outputting signals to external devices such as the host device 2. For example, the motor drive information signal So relating to the drive state of the motor 3 (fan 5) is output to the host device 2 from the terminal P3.

The terminals P4 to P6 are output terminals for driving the motor 3. The terminals P4 to P6 are provided so as to correspond to the phases of the motor 3. For example, the terminal P4 is connected to one end of the coil Lu of the U phase, the terminal P5 is connected to one end of the coil Lv of the V phase, and the terminal P6 is connected to one end of the coil Lw of the W phase.

The power source voltage Vdc input to the power source terminal P1 is supplied to a power source end P7 for driving through a power source line Lp via the power cutoff circuit 18 and the protection circuit 15. The power source end P7 for driving is an end portion of an electric power supplying route for supplying a drive voltage for giving electric power to the load with respect to the motor drive circuit 12. The power source line Lp is an electric power supplying route for supplying electric power for driving the motor 3 via the motor drive circuit 12 and is wiring, for example. Capacitors C5 and C6 serving as stabilizing capacities for stabilizing the potential of the power source end P7 for driving is connected to the power source line Lp. The power cutoff circuit 18 and the protection circuit 15 are described below.

The power source circuit 17 is a circuit that generates a drive voltage Vin serving as a power source voltage of the control circuit 11. The power source circuit 17 is a series regulator circuit or a switching regulator circuit, for example, and steps down the power source voltage Vdc (for example, 12 V) supplied from the power source terminal P1 via the power cutoff circuit 18 and the diode D5, generates the drive voltage Vin (for example, 5 V) of the DC, and supplies the drive voltage Vin to the control circuit 11 as the power source voltage.

The control circuit 11 is a circuit for integrally controlling the operation of the motor drive control device 1. In the present embodiment, the control circuit 11 is a program processing device having a configuration in which a processor such as a CPU, various storage devices such as a RAM, a ROM, and a flash memory, and peripheral circuits such as a counter (timer), an A/D conversion circuit, a D/A conversion circuit, a clock generation circuit, and an input/output interface circuit are connected to each other via a bus or a dedicated line, for example, and is a Micro Controller Unit (MCU), for example.

The control circuit 11 and the motor drive circuit 12 may have a configuration in which one semiconductor integrated circuit device (IC: Integrated Circuit) is packaged or the control circuit 11 and the motor drive circuit 12 may have a configuration in which the control circuit 11 and the motor drive circuit 12 are packaged as individual integrated circuit device.

The control circuit 11 is formed so as to be operatable by electric power supply from the power source circuit 17. In other words, the control circuit 11 operates with the drive voltage Vin as the power source.

The control circuit 11 controls the driving of the motor 3 by generating a drive control signal Sd for driving the motor 3 and outputting the drive control signal Sd to the motor drive circuit 12. The drive command signal Sc output from the host device 2, the position detection signal Sr output from the position detector 6, and a current detection signal output from the current detection circuit 19 are input to the control circuit 11. A temperature detection signal from a temperature sensor and the like may be input to the control circuit 11 besides the signals described above. The control circuit 11 generates the drive control signal Sd by executing various arithmetic processing and signal processing based on the drive command signal Sc, the position detection signal Sr, the current detection signal, and the like that are input, and outputs the drive control signal Sd to the motor drive circuit 12.

When the drive command signal Sc is input to the terminal P2, the control circuit 11 generates the drive control signal Sd so as to cause the motor 3 to rotate at the target rotational speed specified by the duty ratio of the drive command signal Sc, generates a rotational speed signal (for example, a Frequency Generator (FG) signal) having a frequency corresponding to the actual rotational speed of the motor 3, and outputs the rotational speed signal to the terminal P3 as the motor drive information signal So.

The drive control signal Sd is a Pulse Width Modulation (PWM) signal, for example. Specifically, the drive control signal Sd includes six types of PWM signals corresponding to transistors (switch elements) Q1 to Q6 for driving of the inverter circuit 14 described below.

The motor drive circuit 12 is a circuit that drives the motor 3 based on the drive control signal Sd output from the control circuit 11. The motor drive circuit 12 is formed to be operatable by supplying electric power (power source voltage Vdc) to the power source end P7 for driving through the power source line Lp. Specifically, the motor drive circuit 12 includes the inverter circuit 14 and a pre-drive circuit 13.

The inverter circuit 14 is a circuit that is disposed between the power source end P7 for driving and a ground potential and drives the load based on the input drive control signal Sd. Specifically, the inverter circuit 14 is a circuit that includes at least one switching leg including two transistors for driving connected in series and drives the motor 3 serving as the load by alternately executing an on/off operation (switching operation) by the two transistors for driving based on the input drive control signal Sd.

Specifically, the inverter circuit 14 includes switching legs SWu, SWv, and SWw corresponding to the U phase, the V phase, and the W phase of the motor 3. As illustrated in FIG. 1, the switching legs SWu, SWv, and SWw each include two transistors for driving, that is, transistors Q1 and Q2 for driving, transistors Q3 and Q4 for driving, and transistors Q5 and Q6 for driving connected in series between the power source end P7 for driving and the ground potential via the current detection circuit 19.

The transistors Q1, Q3, and Q5 for driving are MOSFETs of a P-channel type, for example, and the transistors Q2, Q4, and Q6 for driving are MOSFETs of an N-channel type, for example. The transistors Q1 to Q6 for driving may be other types of power transistors such as Insulated Gate Bipolar Transistors (IGBT).

Specifically, the switching leg SWu includes the transistors Q1 and Q2 for driving connected to each other in series, and an output end Nu (one of output ends of the inverter circuit 14) connected to one end of the coil Lu serving as the load via the terminal P4. The output end Nu is a point (hereinafter also referred to as an "intermediate point" of the switching leg SWu) to which the transistor Q1 for driving and the transistor Q2 for driving are commonly connected.

For example, a source electrode serving as a first main electrode of the transistor Q1 for driving is connected to the power source line Lp, and a drain electrode serving as a second main electrode of the transistor Q1 for driving is connected to the terminal P4 (output end Nu). A source electrode serving as a first main electrode of the transistor Q2 for driving is connected to the ground potential via the current detection circuit 19, and a drain electrode serving as a second main electrode of the transistor Q2 for driving is connected to the terminal P4 (output end Nu).

The switching leg SWv includes transistors Q3 and Q4 for driving connected to each other in series, and an output end Nv (one of the output ends of the inverter circuit 14) connected to one end of the coil Lv serving as the load via the terminal P5. The output end Nv is a point (hereinafter also referred to as an "intermediate point" of the switching leg SWv) to which the transistor Q3 for driving and the transistor Q4 for driving are commonly connected.

For example, a source electrode serving as a first main electrode of the transistor Q3 for driving is connected to the power source line Lp, and a drain electrode serving as a second main electrode of the transistor Q3 for driving is connected to the terminal P5 (output end Nv). A source electrode serving as a first main electrode of the transistor Q4 for driving is connected to the ground potential via the current detection circuit 19, a drain electrode serving as a second main electrode of the transistor Q4 for driving is connected to the terminal P5 (output end Nv).

The switching leg SWw includes the transistors Q5 and Q6 for driving connected to each other in series, and an output end Nw (one of the output ends of the inverter circuit 14) connected to one end of the coil Lw serving as the load via the terminal P6. The output end Nw is a point (hereinafter also referred to as an "intermediate point" of the switching leg SWw) to which the transistor Q5 for driving and the transistor Q6 for driving are commonly connected.

For example, a source electrode serving as a first main electrode of the transistor Q5 for driving is connected to the power source line Lp, and a drain electrode serving as a second main electrode of the transistor Q5 for driving is connected to the terminal P6 (output end Nw). A source electrode serving as a first main electrode of the transistor Q6 for driving is connected to the ground potential via the current detection circuit 19, and a drain electrode serving as a second main electrode of the transistor Q6 for driving is connected to the terminal P6 (output end Nw).

The pre-drive circuit 13 generates a drive signal for driving the inverter circuit 14 based on the drive control signal Sd output from the control circuit 11. For example, the pre-drive circuit 13 generates six types of drive signals Vuu, Vul, Vvu, Vvl, Vwu, and Vwl for supplying electric power sufficient to drive a control electrode (gate electrode) of each of the transistors Q1 to Q6 for driving of the inverter circuit 14 based on the drive control signal Sd.

By inputting those drive signals to the gate electrode of each of the transistors Q1 to Q6 for driving of the inverter circuit 14, each of the transistors Q1 to Q6 for driving executes an on/off operation (switching operation). For example, the transistors Q1, Q3, and Q5 for driving of upper arms and the transistors Q2, Q4, and Q6 for driving of lower arms of the switching legs SWu, SWv, and SWw alternately execute the on/off operation. As a result, electric power is supplied to each phase of the motor 3 from the power source end P7 for driving, and the motor 3 rotates.

The current detection circuit 19 is a circuit for detecting the drive current of the motor 3. The current detection circuit 19 includes a resistor Rs, for example. The resistor Rs is connected to the inverter circuit 14 in series between the power source end P7 for driving and the ground potential, for example. The current detection circuit 19 converts current flowing through the coils Lu, Lv, and Lw of the motor 3 to voltage by the resistor Rs, and inputs the voltage to the control circuit 11 as the current detection signal.

The power cutoff circuit 18 is a circuit that cuts off electric power supply to the power source line Lp from the power source terminal P1 when high current such as a current exceeding the rating flows to the power source line Lp from the power source terminal P1. The power cutoff circuit 18 is a fuse, for example.

The protection circuit 15 is a circuit for preventing failures and malfunctions of electronic parts caused when an abnormal current flows to an internal circuit of the motor drive control device 1 from the power source terminal P1. The protection circuit 15 has the power-supply reverse-connection protection function and the inrush current suppression function.

Specifically, the protection circuit 15 includes transistors Qa and Qb for protection that are connected provided on the power source line Lp coupling the power source terminal P1 with the power source end P7 for driving. The protection circuit 15 may further include a capacitor C2.

The transistor Qa for protection is an element for realizing the inrush current suppression function, and the transistor Qb for protection is an element for realizing the power-supply reverse-connection protection function. The transistors Qa and Qb for protection are MOSFETs of the N-channel type, for example.

The transistors Qa and Qb for protection are connected to each other in series on the power source line Lp. Specifically, a source electrode serving as a first main electrode of the transistor Qa for protection is connected to a source electrode serving as a first main electrode of the transistor Qb for protection, a drain electrode serving as a second main electrode of the transistor Qa for protection is connected to the power source terminal P1 via the power cutoff circuit 18 (fuse), and a drain electrode serving as a second main electrode of the transistor Qb for protection is connected to the power source end P7 for driving. The gate electrodes serving as the control electrodes of the transistors Qa and Qb for protection are commonly connected to the booster unit 16. The capacitor C2 is an element for causing the change of a gate voltage of the transistors Qa and Qb for protection to be gradual and is connected between the gate electrodes and the source electrodes of the transistors Qa and Qb for protection.

The booster unit 16 is a circuit that generates voltage for driving the transistors Qa and Qb for protection of the protection circuit 15. The booster unit 16 includes a capacitor C1 having one terminal connected to one (specifically, an intermediate point of any one of the switching legs SWu, SWv, and SWw) of the output ends of the inverter circuit 14, causes a voltage exceeding the power source voltage Vdc to be generated across another terminal of the capacitor C1, and applies the voltage to the control electrodes (gate electrodes) of the transistors Qa and Qb for protection.

The booster unit 16 forms a charge pump circuit with the switching legs connected to the capacitor C1. Specifically, by continuously switching the voltage across one terminal of the capacitor C1 between the potential of the power source end P7 for driving and the ground potential in accordance with the switching operation of one of the transistors Q1 and Q2, Q3 and Q4, and Q5 and Q6 for driving of the switching legs connected to the capacitor C1, the booster unit 16 causes a voltage exceeding the power source voltage Vdc to be generated across the other terminal of the capacitor C1, and applies the voltage to the control electrodes (gate electrodes) of the transistors Qa and Qb for protection.

More specifically, the booster unit 16 includes a first rectifier element D1, a second rectifier element D2, the capacitor C1, and resistors R1 and R2.

One terminal of the capacitor C1 is connected to any one of the output ends Nu, Nv, and Nw of the switching legs SWu, SWv, and SWw, and another end of the capacitor C1 is commonly connected to the first rectifier element D1 and the second rectifier element D2. In the present embodiment, as one example, one end of the capacitor C1 is described to be connected to the output end Nw (terminal P6) of the switching leg SWw of the W phase via the resistor R2 but is not limited to this configuration. For example, one end of the capacitor C1 may be connected to the output end Nu (terminal P4) of the switching leg SWu of the U phase or the output end Nv (terminal P5) of the switching leg SWv of the V phase.

The other terminal of the capacitor C1 is connected to a node to which the first rectifier element D1 and the second rectifier element D2 are commonly connected.

The first rectifier element D1 is connected between the power source terminal P1 and another terminal of the capacitor C2 and flows current to the capacitor C1 side from the power source terminal P1 side. The second rectifier element D2 is connected between the other terminal of the capacitor C1 and the gate electrodes (control electrodes) of the transistors Qa and Qb for protection and flows current to the gate electrode side of the transistors Qa and Qb for protection from the capacitor C1 side.

The first rectifier element D1 and the second rectifier element D2 are diodes, for example. For example, an anode of the diode serving as the first rectifier element D1 is connected to the power source terminal P1 via the power cutoff circuit 18 (fuse), and a cathode of the first rectifier element D1 is connected to one end of the resistor R1. An anode of the diode serving as the second rectifier element D2 is connected to another end of the resistor R1, and a cathode of the second rectifier element D2 is connected to the gate electrodes of the transistors Qa and Qb for protection.

The resistors R1 and R2 are elements for inrush current prevention. The resistor R1 limits current flowing into the capacitor C1 and the protection circuit 15 (for example, the gate electrodes of the transistors Qa and Qb for protection and the capacitor C2). The resistor R2 limits current at the time of charge and discharge of the capacitor C1. As described above, the resistor R1 is connected between the first rectifier element D1 and the other terminal of the capacitor C1, and the resistor R2 is connected between one terminal of the capacitor C1 and the output end (for example, the output end Nw of the switching leg SWw) of the inverter circuit 14.

As described below, by providing the resistors R1 and R2, a gate-source voltage Vgs of the transistors Qa and Qb for protection gradually rises and an inrush current flowing into the capacitors C5 and C6 is suppressed.

Next, the operation of the booster unit 16 is described.

As described above, the voltage across one terminal of the capacitor C1 of the booster unit 16 switches to the power source end P7 for driving or the ground potential (via the resistor Rs) in accordance with a signal (a switching operation of one switching leg SWw) output from one output end of the inverter circuit 14 of the motor drive circuit 12.

Specifically, in the switching leg SWw, when the transistor Q5 for driving is turned off and the transistor Q6 for driving is turned on, the voltage across one terminal of the capacitor C1 becomes the ground potential via the transistor Q6 for driving and the resistors R2 and Rs. As a result, current flows into the capacitor C1 from the power source terminal P1 via the first rectifier element D1 and the resistor R1, and hence the capacitor C1 is charged. At this time, the current flowing to the capacitor C1 is limited by the resistor R1 and the resistor R2.

Thereafter, in the switching leg SWw, when the transistor Q6 for driving is turned off and the transistor Q5 for driving is turned on, the voltage across one terminal of the capacitor C1 becomes the potential of the power source end P7 for driving via the transistor Q5 for driving. As a result, the voltage across the other terminal of the capacitor C1 is raised by a voltage equivalent to charge stored in the capacitor C1 based on the power source end P7 for driving.

As a result, a voltage reduced from the voltage across the other terminal of the capacitor C1 by the amount of a forward voltage of the diode serving as the second rectifier element D2 is applied to the gate electrodes of the transistors Qa and Qb for protection. At this time, current flowing into the protection circuit 15 (the gate electrodes of the transistors Qa and Qb for protection and the capacitor C2) from the capacitor C1 is limited by the resistor R2.

By alternately repeating the on/off operation (switching operation) by the two transistors Q5 and Q6 for driving, current flows into the protection circuit 15 (the gate electrodes of the transistors Qa and Qb for protection and the capacitor C2) from the booster unit 16, the gate-source voltage Vgs of the transistors Qa and Qb for protection gradually rises, and the transistors Qa and Qb for protection are gradually turned on. As a result, the inrush current flowing into the capacitors C5 and C6 are suppressed.

By continuously repeating the on/off operation (switching operation) of the two transistors for driving, the transistors Qa and Qb for protection are completely turned on, and the power source voltage Vdc is supplied to the power source end P7 for driving from the power source terminal P1 through the power source line Lp via the power cutoff circuit 18 and the transistors Qa and Qb for protection. At this time, the voltage across the other terminal of the capacitor C1 becomes a voltage that is about twice as much as the power source voltage Vdc, and a voltage lower than the power source voltage Vdc by the amount of a forward voltage of the first rectifier element D1 and the second rectifier element D2 is continued to be supplied from the booster unit 16 as the gate-source voltage Vgs of the transistors Qa and Qb for protection.

Figure 2:
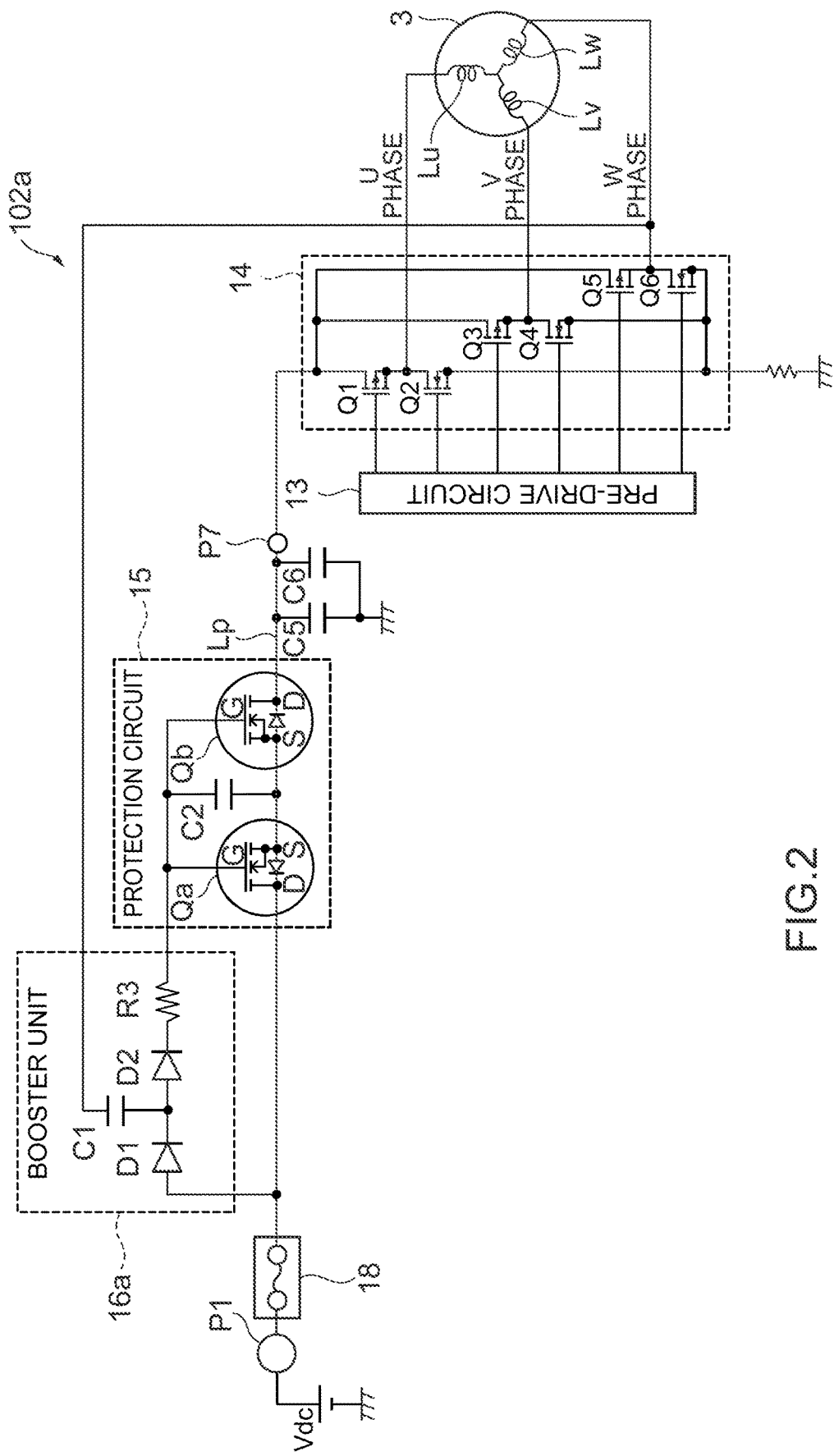
FIG. 2 is a diagram illustrating another configuration example of a load drive circuit according to the embodiment of the present disclosure.

The connection destinations of the resistors R1 and R2 serving as elements for inrush current prevention are not limited to the example illustrated in FIG. 1. FIG. 2 is a diagram illustrating another configuration example of a load drive circuit according to the embodiment of the present disclosure. As in a booster unit 16a of a load drive circuit 102a illustrated in FIG. 2, a resistor R3 may be connected between the cathode of the diode serving as the second rectifier element D2 and the gate electrodes of the transistors Qa and Qb for protection. According to this configuration, current flowing into the protection circuit 15 (the gate electrodes of the transistors Qa and Qb for protection and the capacitor C2) from the capacitor C1 is limited by the resistor R3.

Next, an operation of the motor drive control system 100 according to the present embodiment is described.

Figure 3:
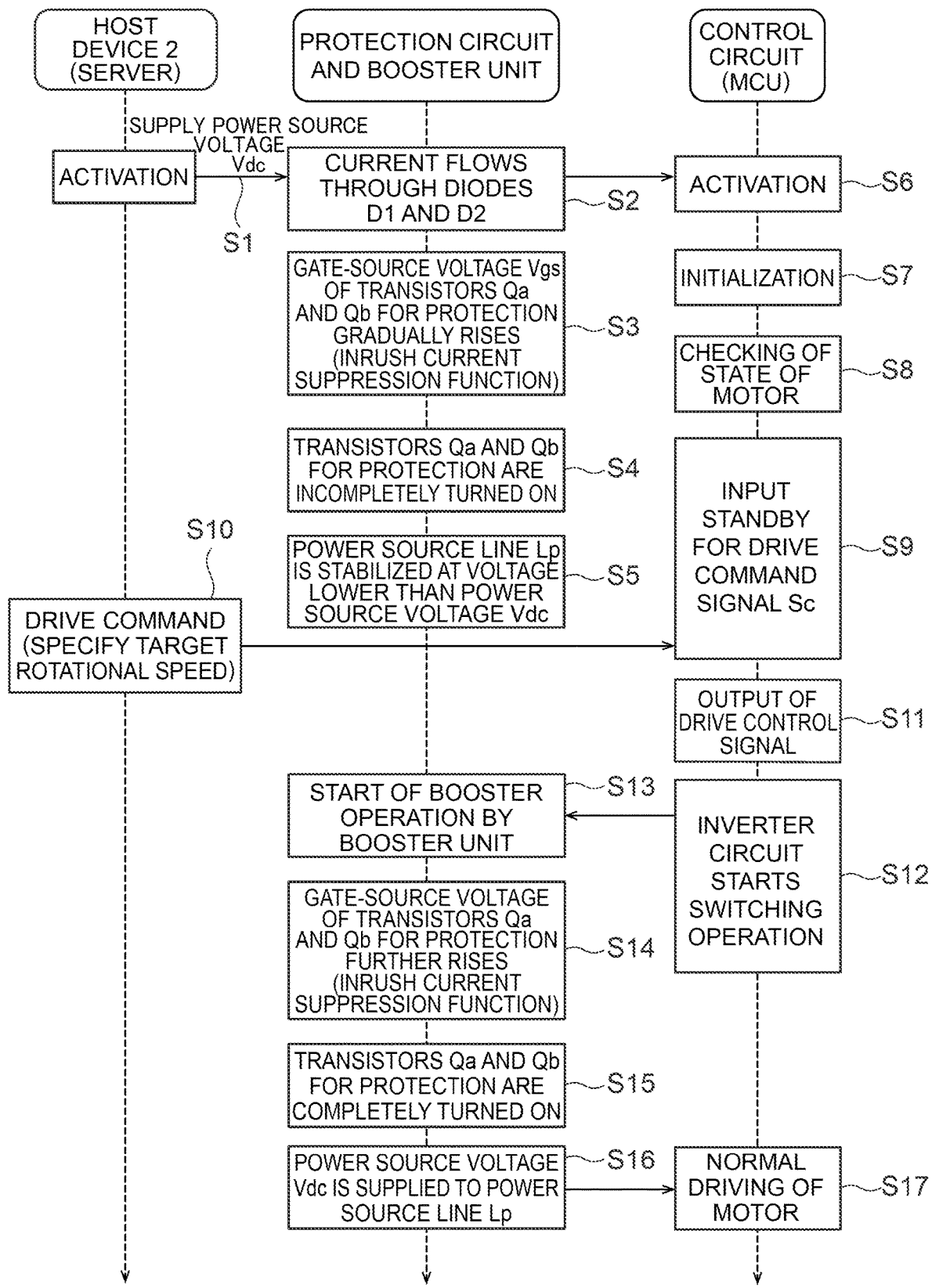
FIG. 3 is a sequence diagram illustrating a flow of an operation by the motor drive control system according to the present embodiment.

FIG. 3 is a sequence diagram illustrating a flow of the operation by the motor drive control system 100 according to the present embodiment.

Figure 4:
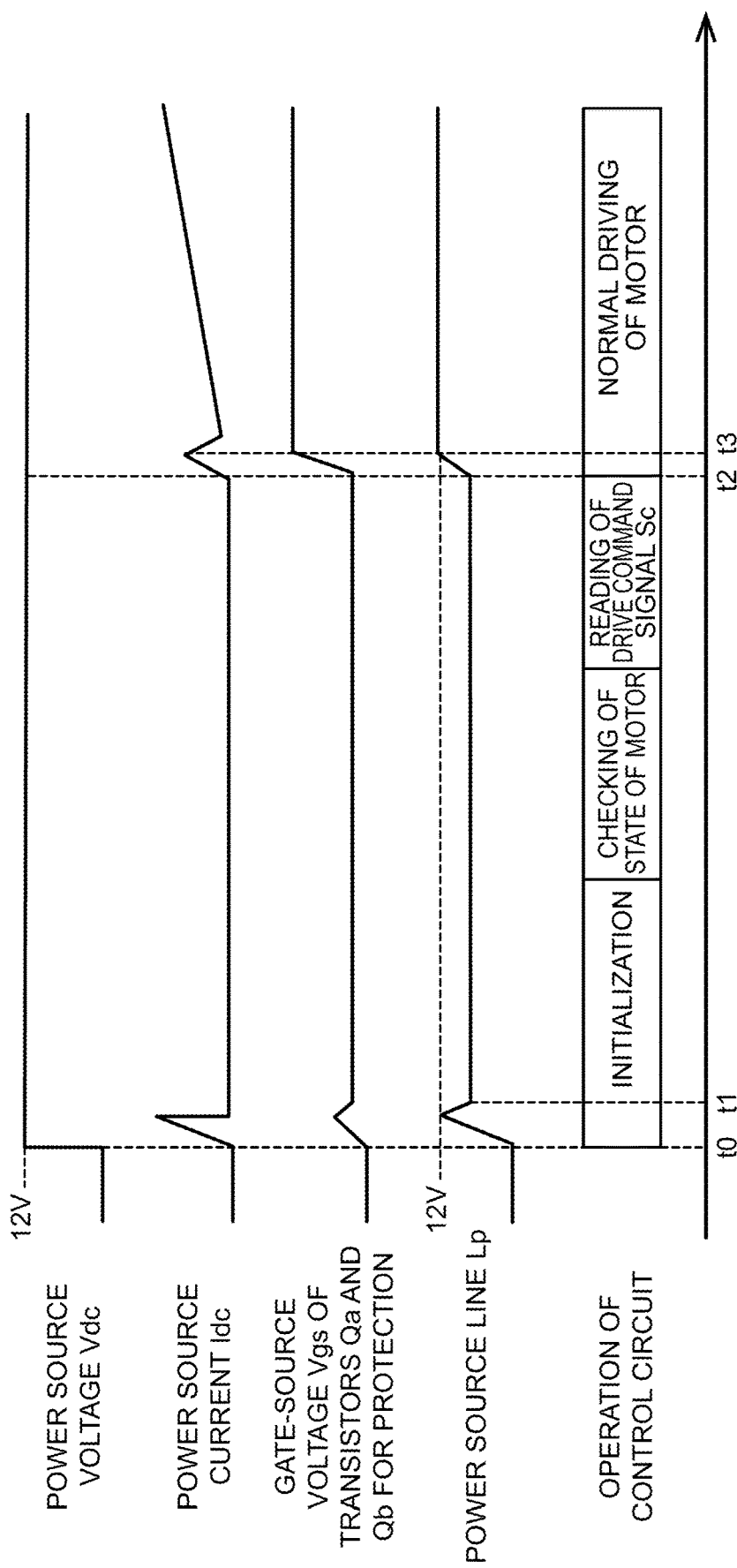
FIG. 4 is a timing chart showing main voltages and operation contents of a control circuit in the motor drive control device according to the present embodiment.

FIG. 4 is a timing chart illustrating main voltages and operation contents of the control circuit 11 in the motor drive control device 1 according to the present embodiment.

In the description below, as one example, in the initial state of the motor drive control system 100, voltages across all nodes including the power source line Lp in the motor drive control device 1 are 0 V. As one example, the power source voltage Vdc is 12 V.

For example, at time t0 in FIG. 4, when the information processing apparatus (host device 2) such as the server in which the motor drive control system 100 including the fan 5 is installed is activated, the power source voltage Vdc is supplied to the power source terminal P1 of the motor drive control device 1 (Step S1). As a result, electric power is supplied to each of the motor drive circuit 12 (power source end P7 for driving) side and the control circuit 11 side of the motor drive control system 100 by different routes. Current flowing through the electric power supplying route on the motor drive circuit 12 side is referred to as a power source current Idc.

First, in the electric power supplying route on the motor drive circuit 12 side, from the time t0 in FIG. 4 onward, the power source current Idc flows into the gate electrodes of the transistors Qa and Qb for protection and the capacitor C2 of the protection circuit 15 from the power source terminal P1 through the first rectifier element D1, the second rectifier element (diode) D2, and the resistor R1 of the booster unit 16 (Step S2).

At this time, the current flowing into the protection circuit 15 is limited by the resistor R1 as described above. As a result, as illustrated in FIG. 4, from the time t0 onward, the gate-source voltage Vgs of the transistors Qa and Qb for protection gradually rises, and hence a rapid increase of the power source current Idc flowing into the capacitors C5 and C6 from the power source terminal P1 via the protection circuit 15 is suppressed, and the inrush current is suppressed (Step S3).

Thereafter, due to the rise of the gate-source voltage Vgs of the transistors Qa and Qb for protection, the transistors Qa and Qb for protection are incompletely turned on (Step S4). As a result, the capacitors C5 and C6 serving as stabilizing capacities connected to the power source line Lp are charged, and the voltage across the power source line Lp rises to about Vdc (=12 V), but the voltage across the power source line Lp (in other words, the power source end P7 for driving) is stabilized at a voltage lower than the power source voltage Vdc from time t1 in FIG. 4 onward by being divided by the gate-source capacities of the transistors Qa and Qb for protection and the capacitor C2, and the capacitors C5 and C6 (Step S5).

At this time, the voltage across the gate electrodes of the transistors Qa and Qb for protection is Vdc (=12 V) and the source electrodes of the transistors Qa and Qb for protection have a voltage equivalent to the power source line Lp, and hence the transistors Qa and Qb for protection maintain a state of being incompletely turned on.

Next, the electric power supplying route on the control circuit 11 side is described. When the power source voltage Vdc is supplied to the power source terminal P1 of the motor drive control device 1 in Step S1, the power source voltage Vdc is supplied to the power source circuit 17 via the diode D5. As a result, the power source circuit 17 steps down the power source voltage Vdc and generates the drive voltage Vin, and the control circuit 11 is activated by supplying the drive voltage Vin to the control circuit 11 (Step S6).

After the activation, first, the control circuit 11 executes initialization processing of a microcontroller (Step S7).

Thereafter, the control circuit 11 checks the state of the motor 3 (Step S8). For example, the control circuit 11 checks the state of the motor 3 by acquiring the position detection signal Sr from the position detector 6 and the current detection signal from the current detection circuit 19.

Thereafter, the control circuit 11 is placed in an input standby state for the drive command signal Sc (Step S9). The control circuit 11 stands by until the drive command signal Sc serving as a speed command value is input from the host device 2.

Then, at time t2 in FIG. 4, the host device 2 outputs the drive command signal Sc ordering the rotation of at the motor 3 at the target rotational speed to the motor drive control device 1 (Step S10). The motor drive control device 1 generates the drive control signal Sd (PWM signal) so as to cause the motor 3 to rotate at the target rotational speed specified by the input drive command signal Sc and gives the drive control signal Sd to the motor drive circuit 12 (Step S11).

The motor drive circuit 12 starts the switching operation of each of the switching legs SWu, SWv, and SWw of the inverter circuit 14 based on the input drive control signal Sd (PWM signal) (Step S12). As a result, the coils Lu, Lv, and Lw of the motor 3 are energized.

When the switching leg SWw starts the switching operation in Step S12, booster operation by the booster unit 16 is started (Step S13). Specifically, from the time t2 in FIG. 4 onward, the transistors Q5 and Q6 for driving of the switching leg SWw of the inverter circuit 14 alternately starts the on/off operation, and hence the voltage across one terminal of the capacitor C1 of the booster unit 16 is switched between the ground potential and the potential of the power source end P7 for driving. As a result, an operation of charging the capacitor C1 from the power source terminal P1 via the first rectifier element D1 and an operation of boosting the voltage across the other terminal of the capacitor C1 by the amount of the charged voltage of the capacitor C1 based on the potential of the power source end P7 for driving are repeated.

At this time, the current that charges and discharges the capacitor C1 is limited by the resistors R1 and R2 as described above. Therefore, when the switching operation of the switching leg SWw starts, the current supplied to the protection circuit 15 from the capacitor C1 is limited and the voltage across the gate electrodes of the transistors Qa and Qb for protection exceeds the power source voltage Vdc and gradually rises, and hence the gate-source voltage Vgs of the transistors Qa and Qb for protection gradually rises (Step S14). As a result, a rapid increase of the power source current ldc flowing into the capacitors C5 and C6 from the power source terminal P1 via the protection circuit 15 is suppressed, and the inrush current is suppressed.

For example, at time t3 in FIG. 4, by the rise of the gate-source voltage Vgs of the transistors Qa and Qb for protection in Step S14, the transistors Qa and Qb for protection that have been turned on in an incomplete state are completely turned on (Step S15). As a result, the voltage across the power source line Lp rises to the power source voltage Vdc (=12 V) (Step S16). Thereafter, the transistors Qa and Qb for protection are continued to be completely turned on as long as the switching operation of the switching leg SWw continues, and hence the power source voltage Vdc is continued to be supplied to the power source end P7 for driving of the inverter circuit 14 of the motor drive circuit 12 from the power source line Lp.

The booster operation of the booster unit 16 described above is completed before a high current starts to flow through the motor 3, and hence there is no problem even when the driving of the motor 3 and the booster operation simultaneously start.

By the above, an appropriate voltage (power source voltage Vdc) can be applied to the coils Lu, Lv, and Lw of the motor 3 and the coils Lu, Lv, and Lw can be energized, and hence normal driving of the motor 3 becomes possible (Step S17). For example, from the time t3 in FIG. 4 onward, the duty ratio of the drive control signal Sd (PWM signal) continuously rises until the rotational speed of the motor 3 reaches the target rotational speed specified by the drive command signal Sc, and hence the power source current ldc continues to rise.

As above, according to the motor drive control device 1 in which the load drive circuit 102 according to the present embodiment is installed, even when the protection circuit 15 provided on the power source line Lp coupling the power source terminal P1 with the power source end P7 for driving is realized by the transistors Qa and Qb for protection of the N-channel type and not of the P-channel-type, a switching element for the charge pump circuit that generates voltage for driving the transistors for protection does not necessarily need to be newly provided as in the related art.

Specifically, in the motor drive control device 1, one terminal of the capacitor C1 of the booster unit 16 is connected to one output end (specifically, an intermediate point of any one (for example, the switching leg SWw) of the switching legs SWu, SWv, and SWw) of the inverter circuit 14. According to this configuration, the charge pump circuit can be realized by two transistors for driving of any one of the switching legs SWu, SWv, and SWw and the booster unit 16.

In other words, as described above, when the motor 3 is driven, by alternately switching the two transistors Q5 and Q6 for driving forming one switching leg SWw of the inverter circuit 14, the voltage across one terminal of the capacitor C1 of the booster unit 16 is continuously switched between the potential of the power source end P7 for driving and the ground potential. As a result, the capacitor C1 can be charged, and a voltage exceeding the power source voltage Vdc can be generated across the other terminal of the capacitor C1. By applying the voltage generated as above to the gate electrodes of the transistors Qa and Qb for protection, the transistors Qa and Qb for protection can be appropriately driven.

As above, according to the motor drive control device 1 according to the present embodiment, the switching element for the charge pump circuit that generates the voltage for driving the transistors Qa and Qb for protection of the N-channel type can be shared with the transistors for driving of the switching legs for driving the motor 3. Therefore, as compared to the related art, a dedicated IC and the like for driving the charge pump circuit do not necessarily need to be provided, and the increase of the circuit scale of the motor drive control device 1 can be suppressed. The charge (current) necessary for completely turning the transistors Qa and Qb for protection on is extremely small considering the capacity of the capacitor C2, and hence small and inexpensive parts can be used for parts forming the booster unit 16.

Therefore, according to the load drive circuit 102 according to the present embodiment, the protection function of the motor drive control device 1 can be realized with a lower cost.

In the motor drive control device 1, the booster unit 16 further includes the first rectifier element D1 for flowing current to the capacitor C1 side from the power source terminal P1 side, the first rectifier element D1 being connected between the power source terminal P1 and the other terminal of the capacitor C1, and the second rectifier element D2 for flowing current to the control electrode side of the transistors Qa and Qb for protection from the capacitor C1 side, the second rectifier element D2 being connected between the other terminal of the capacitor C1 and the control electrodes (gate electrodes) of the transistors Qa and Qb for protection.

According to this configuration, the operation of the charge pump circuit in accordance with the signal (the switching operation of one switching leg SWw) output from one output end of the inverter circuit 14, in other words, the charging operation of the capacitor C1 by the power source voltage Vdc, and the suppling operation of the charged voltage of the capacitor C1 based on the power source voltage Vdc to the gate electrodes of the transistors Qa and Qb for protection can be realized by a simple circuit configuration.

The booster unit 16 includes the resistor R1 connected between the first rectifier element D1 and the other terminal of the capacitor C1, and the resistor R2 connected between one terminal of the capacitor C1 and the intermediate point of the switching leg SWw. By the resistors R1 and R2, the gate-source voltage Vgs of the transistors Qa and Qb for protection can gradually rise, and the inrush current flowing into the capacitors C5 and C6 can be suppressed.

In the motor drive control device 1, the control circuit 11 operates by electric power supply from a route not passing through the transistors Qa and Qb for protection. According to this configuration, even in a state in which sufficient electric power is not supplied to the power source line Lp, the control circuit 11 can generate the drive control signal Sd, cause the switching leg SWw of the motor drive circuit 12 to perform the switching operation, and cause the booster operation by the booster unit 16 to be performed, and hence the transistors Qa and Qb for protection can be turned on more reliably.

Expansion of Embodiment

The disclosure made by the inventors of the present disclosure has been specifically described based on the embodiment above, but it goes without saying that the present disclosure is not limited to the embodiment and various modifications can be made without departing from the gist of the disclosure.

For example, in the abovementioned embodiment, a case where the protection circuit 15 has the power-supply reverse-connection protection function and the inrush current suppression function is described, but the present disclosure is not limited to this configuration. For example, it is possible for the protection circuit 15 to have only either one function of the power-supply reverse-connection protection function and the inrush current suppression function in accordance with a specification required for the motor drive control device 1. For example, when only the inrush current suppression function is required as the function of the protection circuit 15, the protection circuit 15 does not necessarily need to include the transistor Qb for protection.

In the abovementioned embodiment, a case where the charge pump circuit (booster unit 16) is activated due to the driving of the load (motor 3) is exemplified, but the present disclosure is not limited to this configuration, and the driving of the load and the activation of the charge pump circuit may be individually controlled. Specifically, the control circuit 11 may have a load drive mode for controlling the switching operation of the transistors Q1 to Q6 for driving of the plurality of the switching legs SWu, SWv, and SWw forming the inverter circuit 14 and driving the motor 3, and a booster mode for controlling the switching operation of the transistors Q5 and Q6 for driving of one switching leg SWw and driving the booster unit 16.

For example, it is possible for the control circuit 11 to control the switching operation of only the switching leg SWw of the inverter circuit 14, and the control circuit 11 may drive the booster unit 16 and completely turn on the transistors Qa and Qb for protection of the protection circuit 15 by operating in the booster mode immediately after the activation. Then, when the control circuit 11 receives the drive command signal Sc from the host device 2, the control circuit 11 may shift into the load drive mode, control the switching operation of all of the switching legs SWu, SWv, and SWw, and drive the motor 3.

According to this configuration, the protection circuit 15 can be activated and an appropriate voltage (power source voltage Vdc) can be supplied to the power source line Lp before the driving of the motor 3 starts, and hence motor drive control that is more reliable can be realized.

The number of phases of the motor driven by the motor drive control device 1 of the embodiment described above is not limited to three phases. The number of the Hall elements is not limited to three.

In the abovementioned embodiment, the type of the motor 3 is not particularly limited. For example, the motor 3 is not limited to a brushless DC motor and may be a stepping motor. The load to be driven by the load drive circuit 102 is not limited to the motor 3. In other words, the load drive circuit 102 can also be applied to an electronic device that drives a load other than the motor drive control device 1.

The timing chart and the sequence diagram described above are one example, and the present disclosure is not limited to the timing chart and the sequence diagram. For example, other processing may be inserted between the steps, and processing may be parallelized.

What is claimed is:

1. A load drive circuit comprising:
    a power source terminal supplied with a power source voltage;
    a power source line;
    a protection circuit including two N-channel type transistors connected in series between the power source terminal and the power source line, wherein each N-channel type transistor comprises a control electrode;
    an inverter circuit configured to drive a load based on a drive control signal, the inverter circuit being disposed between the power source line and a ground potential; and
    a booster unit configured to generate a voltage exceeding the power source voltage, and apply the voltage to both the control electrodes, wherein
        the inverter circuit includes a plurality of switching legs each including two transistors for driving connected in series between the power source line and the ground potential; and
        the booster unit includes a capacitor, a first rectifier element, and a second rectifier element, wherein:
        one terminal of the capacitor is connected to a connection node between one of the switching legs,
        the first rectifier element is connected between the power source terminal and the other terminal of the capacitor, and configured to flow current to the capacitor side from the power source terminal side, and the second rectifier element is connected between the other terminal of the capacitor and the control electrode of the two N-channel type transistors, and configured to flow current to the control electrode side of the two N-channel type transistors from the capacitor side.

2. The load drive circuit according to claim 1, wherein the booster unit further includes:
a first resistor connected between the first rectifier element and the other terminal of the capacitor; and
a second resistor connected between the one terminal of the capacitor and the connection node between one of the switching legs.

3. The load drive circuit according to claim 1, wherein the booster unit further includes a resistor connected between the second rectifier element and the control electrode of the two N-channel type transistors.

4. A motor drive control device comprising:
a control circuit configured to generate a drive control signal;
a power source terminal supplied with a power source voltage;
a power source line;
a protection circuit including two N-channel type transistors connected in series between the power source terminal and the power source line; wherein each N-channel type transistor comprises a control electrode,
an inverter circuit configured to drive a motor based on the drive control signal from the control circuit, the inverter circuit being disposed between the power source line and a ground potential; and
a booster unit configured to generate a voltage exceeding the power source voltage, and apply the voltage to both the control electrodes, wherein:
the inverter circuit includes a plurality of switching legs each including two transistors for driving connected in series between the power source line and the ground potential; and
the booster unit includes a capacitor, a first rectifier element, and a second rectifier element, wherein:
one terminal of the capacitor is connected to a connection node between one of the switching legs,
the first rectifier element is connected between the power source terminal and the other terminal of the capacitor, and configured to flow current to the capacitor side from the power source terminal side, and
the second rectifier element is connected between the other terminal of the capacitor and the control electrode of the two N-channel type transistors, configured to flow current to the control electrode side of the two N-channel type transistors from the capacitor side.

5. The motor drive control device according to claim 4, wherein:
the control circuit has a load drive mode and a booster mode as operation modes, wherein the load drive mode is for controlling switching operation of the transistors for driving of the plurality of switching legs and driving the motor, and the booster mode is for controlling switching operation of the transistors for driving of one of the switching legs and driving the booster unit.

6. The motor drive control device according to claim 4, wherein the motor drive control device further includes:
a power source circuit that steps down the power source voltage supplied from the power source terminal, generates a drive voltage, and supplies the drive voltage to the control circuit.

7. A motor unit comprising:
a motor; and
a motor drive control device, wherein the motor drive control device includes:
a control circuit configured to generate a drive control signal;
a power source terminal supplied with a power source voltage;
a power source line;
a protection circuit including two N-channel type transistors connected in series between the power source terminal and the power source line; wherein each N-channel type transistor comprises a control electrode;
an inverter circuit configured to drive a load based on a drive control signal from the control circuit, the inverter circuit being disposed between the power source line and a ground potential; and
a booster unit configured to generate a voltage exceeding the power source voltage, and apply the voltage to both the control electrodes, wherein:
the inverter circuit includes a plurality of switching legs each including two transistors for driving connected in series between the power source line and the ground potential; and
the booster unit includes a capacitor, a first rectifier element, and a second rectifier element, wherein:
one terminal of the capacitor is connected to a connection node between one of the switching legs,
the first rectifier element is connected between the power source terminal and the other terminal of the capacitor, and configured to flow current to the capacitor side from the power source terminal side, and
the second rectifier element is connected between the other terminal of the capacitor and the control electrode of the two N-channel type transistors, configured to flow current to the control electrode side of the two N-channel type transistors from the capacitor side.

* * * * *